June 25, 1963

E. SCHMOOK, JR 3,095,022

MEAT COMMINUTOR

Filed May 5, 1960

INVENTOR.
EDWARD SCHMOOK, JR.
BY
Cromwell, Greist and Warden
ATTORNEYS.

June 25, 1963  E. SCHMOOK, JR  3,095,022
MEAT COMMINUTOR
Filed May 5, 1960  2 Sheets-Sheet 2
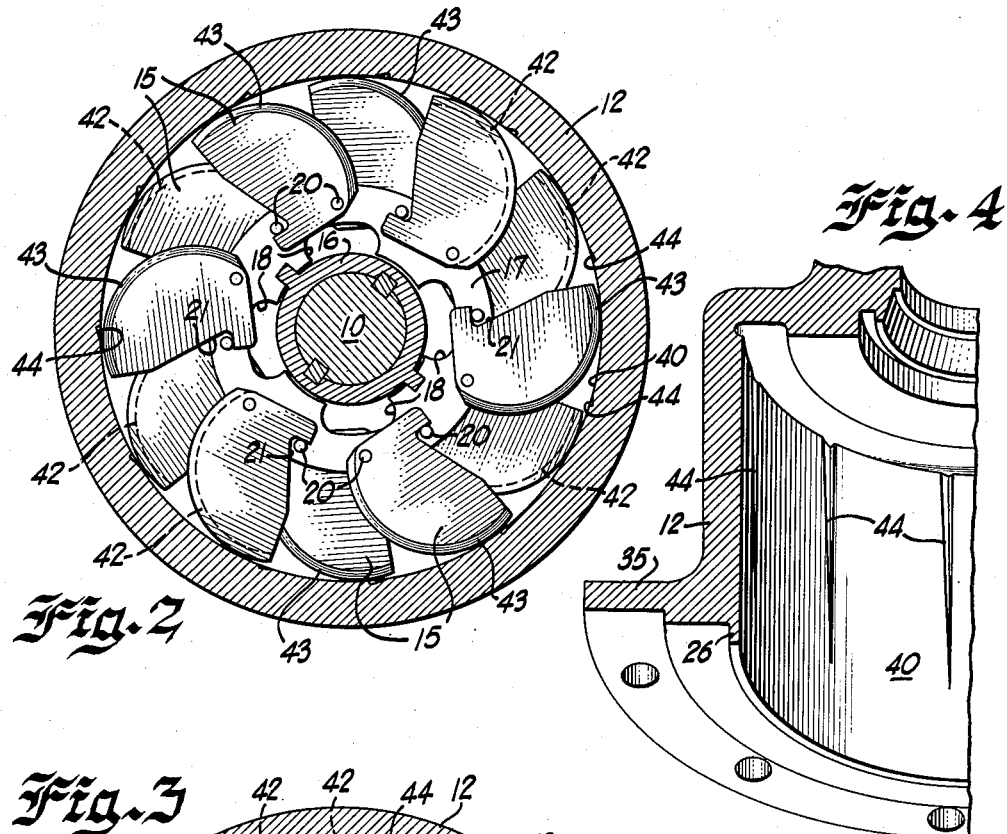
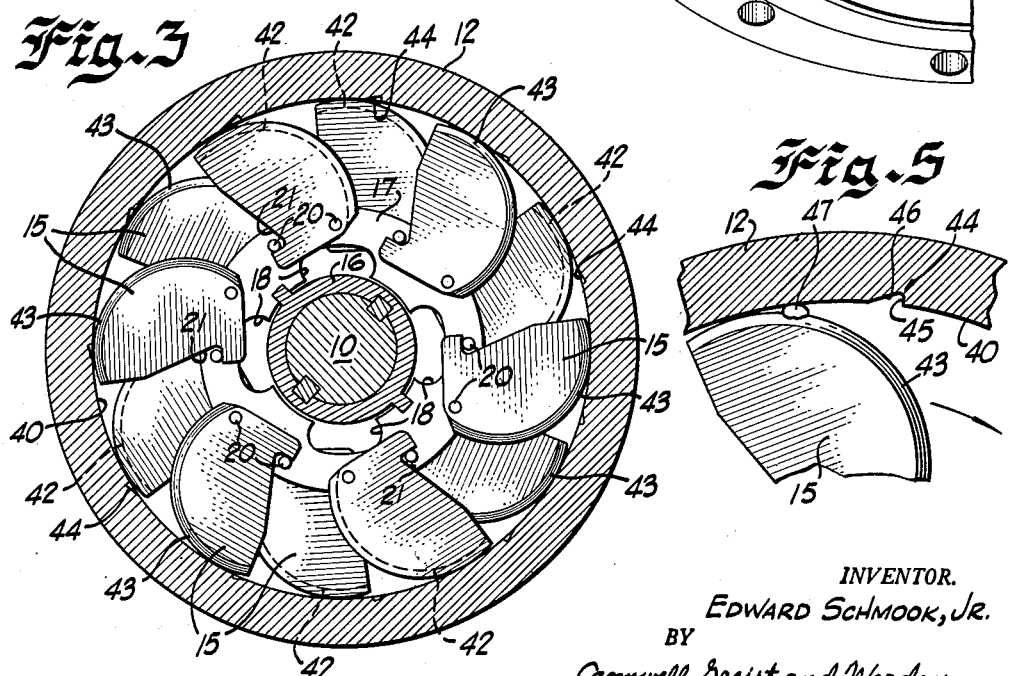
INVENTOR.
EDWARD SCHMOOK, JR.
BY
Cromwell, Greist and Warden
ATTORNEYS.

United States Patent Office 3,095,022
Patented June 25, 1963

3,095,022
MEAT COMMINUTOR
Edward Schmook, Jr., Madison, Wis., assignor to Oscar Mayer & Company, Inc., Chicago, Ill., a corporation of Illinois
Filed May 5, 1960, Ser. No. 27,105
11 Claims. (Cl. 146—192)

The present invention relates to new and improved material comminution apparatus of a type known as a continuous chopper particularly adapted for use in the comminution of meat in the manufacture of sausage-type products. More specifically, the present invention deals with improvements in material comminution apparatus of the type described, these improvements providing for greater efficiency in high speed comminution of meat and the like under closely controlled conditions.

High speed operation of comminution apparatus for meat particle-size reduction in the manufacture of sausage and wiener type products has been found highly desirable particularly with regard to the minimizing of mechanical working of the meat during comminution and controlling the temperature rise thereof. Copending application Serial No. 816,127, filed May 22, 1959 discloses an efficient continuous chopper unit which provides for improved material handling during comminution thereof and accomplishes continuous operation without temperature damage or mechanical damage to the meat undergoing comminution. The continuous chopper disclosed in my earlier application utilizes principles of operation which provide for continuous introduction of meat particles into a cylindrical chopper housing with the particles being immediately subjected to the action of centrifugal force created by an assembly of blade members rotating at a high speed and extending into close proximity to the inner surface of the housing. The meat continuously fed into the housing is centrifugally accumulated along the inner surface of the housing where it is subjected to fine, high speed chopping by the blade members and along which it moves through the housing in the form of a continuous sleeve-like accumulation. The comminuted meat is continuously discharged from the housing into a collection and discharge zone which rotates with the blade assembly and builds up therein a peripheral accumulation of the comminuted material which is continuously removed from the zone by a discharge nozzle which is stationary in the zone. During continuous comminution in the manner described, the chopper may be subjected to vacuumization or inert gas injection as desired to protect the meat from the destructive action of oxygen and the like available from air mixed therewith. In the type of operation described, the meat is continuously moved through the chopper unit and completely comminuted to the extent desired in a short period of time thus protecting the meat from the destructive action of excessive mechanical working and/or high temperatures.

The continuous chopper unit described in my aforementioned application is of a design lending itself for modification without loss of overall operational effectiveness. Under certain conditions of use, as for example depending upon the material undergoing comminution, it has been considered desirable to controllably retard the progress of the material through the chopper and thus extend the comminution action thereon without experiencing an undesirable temperature rise or for the purpose of obtaining a controlled temperature rise, as the case may be. The type of chopper described is capable of modification in accordance with the principles of the present invention to provide for controlled detention of the material undergoing comminution therein without interrupting continuous operation of the unit.

A problem common to all rotating blade-type choppers resides in the lodging of material, such as meat particles, muscle tissue, etc., on the sharpened edge of the blades. The blades become embedded in relatively tough particles of such material and these particles are retained by the blades and can only be removed by the shutting down of the unit followed by blade assembly removal and cleaning. This type of lodgement cuts down on the effective use of a blade and in the instance of meat comminution, the lodged particles by being retained in the chopper over a substantial period of time become virtually cooked or hardened on the blade. The special design of continuous chopper described above is particularly adapted for improvement to incorporate therein an automatic, self-contained blade cleaning feature which forms a part of the present invention.

It is an object of the present invention to provide new and improved material comminution apparatus particularly adapted for use in the comminution of fibrous material such as meat and the like.

A further object of the present invention is to provide a new and improved high speed continuous chopper utilizing a blade assembly which is rotated at high speeds within a chopper barrel with the cutting edges of the blade members of the blade assembly being maintained in close proximity to the inner surface of the barrel for centrifugal accumulation and comminution of meat particles and the like moving along the inner surface of the barrel, the blade assembly and blade members thereof being designed to control rate of movement of the material undergoing comminution through the unit to an extent that the material may be detained without interruption of continuous movement of material through the chopper and further without undesirable permanent detention of any of the material therein.

Still a further object is to provide a material comminution apparatus of the type described in the foregoing objects which is additionally improved by the incorporation therein of a self-contained blade member cleaning feature which materially extends the period of continuous operational use of the apparatus.

Other objects not specifically set forth will become apparent from the following detailed description of the present invention made in conjunction with the accompanying drawings wherein:

FIG. 2 is a transverse plan view in section of a portion of the apparatus taken generally along line 2—2 in FIG. 1;

FIG. 3 is a view similar to FIG. 2 taken generally along line 3—3 in FIG. 1;

FIG. 4 is a fragmentary perspective of a portion of the apparatus housing of FIG. 1 as viewed from the bottom thereof looking toward the top; and FIG. 5 is an enlarged fragmentary section of a portion of the apparatus illustrating operation of the blade cleaning principle incorporated therein.

Figure 1:
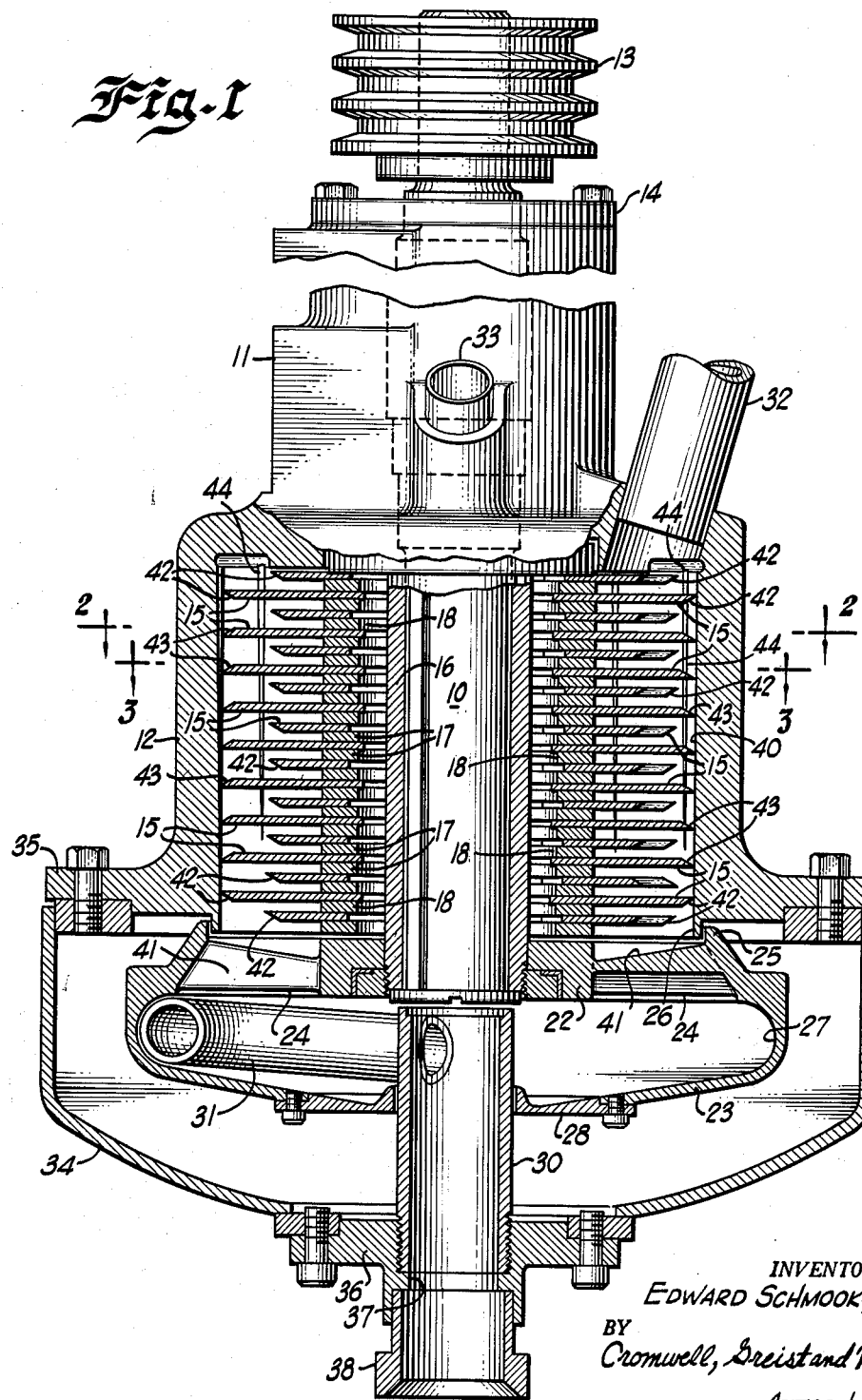
FIG. 1 is a fragmentary vertical section of a special form of material comminution apparatus incorporating therein the improvements and principles of the present invention.

While the material comminution apparatus of the present invention will be described particularly in connection with its use in making comminuted meat products, such as sausage, it will be understood that the assembly is well adapted for use in comminuting, accumulating and discharging in a continuous and automatic manner any material which can be subjected to the sequence of operations to be described.

FIG. 1 illustrates the basic structural features of the embodiment of the continuous chopper to be described. The assembly generally includes a central shaft 10 suitably journaled in a cylindrical housing 11 the upper portion of which functions primarily to mount the shaft 10 and a blade assembly carried thereby for high speed rotation in a lower barrel portion 12 of increased inner diameter. A sheave 13 is fixedly mounted on the top end of the shaft 10 which projects outwardly of a removable cover plate 14 attached to the top surface of the housing 11. The sheave 13 is provided with a plurality of grooves for belt attachment to a suitable power source (not shown) providing for high speed rotation of the shaft 10. The mounting of the shaft 10 within the housing 11 for high speed rotation may be accomplished in any suitable manner.

An assembly of blade members 15 is mounted on the shaft 10 for high speed rotation therewith. The blade member assembly includes a sleeve 16 suitably keyed to the shaft 10 as shown in FIGS. 2 and 3 and having received thereabout a plurality of blade member mounting rings 17 each of which as shown in FIGS. 2 and 3 is provided along the inner periphery thereof with a plurality of circumferentially spaced grooves 18. The rings 17 between some of the grooves 18 along the inner periphery thereof are suitably keyed to the sleeve 16. Each ring 17 on the upper surface thereof is provided with a plurality of pairs of integrally formed, upwardly projecting pins 20 with each pair co-operating to mount a blade member 15 on the ring. Each blade member 15 includes an arcuate, convex cutting edge and at the base thereof an aperture in which one of the pins is received and a notch or groove 21 cut into the flat side surface of the blade member in which the other pin 20 is received. This mounting arrangement of the blade members provides for pivoting of each blade member about the pin 20 which is completely enclosed thereby, the extent of pivoting in a radially outwardly direction being limited by the pin 20 abutting with the base surface of the notch 21. High speed rotation of the blade assembly results in centrifugal urging of the blade members outwardly into very close proximity with the inner surface of the barrel 12. As the outer cutting edge of each blade member wears with continued use, the blade member may be resharpened and the notch 21 further extended to permit added outward pivoting of the blade member to maintain the new edge in close proximity with the inner surface of the barrel.

Referring again to FIG. 1, the bottom end of the shaft 10 projects downwardly out of the barrel 12 and the sleeve 16 has threadedly received thereon a hub member 22 which supports and rotatably drives a cup-shaped material collection means in a form of a rotor 23. Integrally formed spoke-like vanes 24 attach the rotor 23 to the hub 22. The upper lip portion 25 of the rotor 23 overlaps and clears a depending circumferential flange 26 formed integral with the barrel 12. This arrangement provides for rotation of the rotor 23 with the shaft 10 and blade assembly, the rotor receiving comminuted material directly from the barrel 12.

The rotor 23 is provided with a peripheral material collecting zone 27 and includes a bottom central opening which is partially covered by a shield ring 28 suitably bolted in place. The shield ring 28 is centrally apertured and receives therethrough a stationary discharge pipe 30, adequate clearance being provided between the adjacent surfaces of the pipe and the shield plate 28 to permit high speed rotation of the rotor 23 relative to the pipe 30. The pipe 30 at the top portion thereof received within the rotor 23 has suitably secured therein a radially outwardly directed material pick-up nozzle 31 which curves into close association with the surface of the rotor 23 in the material collection zone 27. The outermost end of the nozzle 31 is open to receive material therein in scoop-like manner during rotation of the rotor 23, it being understood that the nozzle 31 is mounted with the discharge pipe 30 in fixed relation.

The housing 11 at the upper portion of the barrel 12 thereof is provided with means for materal delivery into the barrel 12, this means including a material delivery pipe 32. Circumferentially spaced from the pipe 32 is a tube-like fitting 33 communicating with the interior of the barrel 12 adjacent the sleeve 16 for connection with a vacuum line for vacuumization of the chopper unit. Vacuum is impressed on the unit through the fitting 33 with any air introduced into the barrel 12 with the material delivered thereinto through the pipe 32 being withdrawn from the comminution zone between the blade mounting rings 17 and blade members 15, through the vertically aligned grooves 18 of the rings 17, upwardly along the outer periphery of the sleeve 16 and up to the fitting 33. The lowermost blade mounting ring 17 is spaced from the hub 22 to permit the drawing of a vacuum on the interior of the rotor 23. A vacuum seal is provided by a housing 34 suitably secured to a radial flange portion 35 of the barrel 12. The bottom of the housing 34 is centrally apertured and closed off by a bottom cover plate 36 which is provided with a central material discharge opening 37 in which the bottom end of the discharge pipe 30 is threadedly mounted. The outer end of the discharge opening 37 has a sleeve 38 mounted therein for suitable connection with a comminuted material delivery tube or pipe (not shown) through which the comminuted material flows for further processing.

As adequately described in my aforementioned application, material to be comminuted, such as meat in the form of fairly large pieces, is continuously delivered into the barrel 12 through the pipe 32. The meat is introduced adjacent the inner surface 40 of the barrel 12 and the outer convex cutting edges of the blade members 15. Operation of the shaft 10 at high speeds results in comminution of the meat adjacent and along the surface 40 of the barrel 12 as the meat is continuously moved downwardly therealong toward the rotor 23. Centrifugal force maintains the meat undergoing comminution in a sleeve-like accumulation along the surface 40 and the blade members 15 sliced through the accumulated sleeve for non-damaging, free cutting of the meat particles. The continuously moving sleeve of accumulated meat adequately comminuted is delivered from the barrel 40 onto the vanes 24 which are provided with inclined surfaces 41 arranged to direct the comminuted meat radially outwardly toward the collection zone 27 of the rotor 23. The meat then accumulates in the rotor 23 and is discharged therefrom through the nozzle 31 and related discharge elements. During continuous operation, the chopper is maintained under sub-atmospheric conditions by vacuumization in the manner described above or the fitting 33 may be used to inject an inert gas into the chopper if desired.

The rotational speed of operation of the blade assembly will be varied depending upon the degree of comminution desired. While the type of comminution action obtained in operation of the chopper of the present invention results in a material reduction in mechanical working and temperature increase of the meat, it is desirable to control the rate of flow of the meat through the chopper in conjunction with controlling the degree of comminution obtained while retaining temperature rise within prescribed limitations. Where frozen or partially frozen meat is undergoing comminution, it is often desirable to increase the temperature of the meat a controlled amount to improve the processing rate thereof. The location of the bevel on the sharpened edge of each blade member can be used advantageously in controlling the aforementioned factors and constitutes an important aspect of the present invention.

As shown in FIG. 1, the blade members 15 are provided with single beveled surfaces with these surfaces being located either along the bottom of the blade members as indicated by the numeral 42, or along the top of the blade member as indicated by the numeral 43. The bottom bevels 42 function primarily to aid in moving the meat through the chopper for continuous operation as previously described. The top bevels 43 function primarily to slow up or detain movement of the meat undergoing comminution through the chopper to provide for subjecting of the meat to additional comminution action and/or controlled temperature rise.

As best shown in FIG. 1, each series of blade members lies in a single horizontal plane and in referring also to FIGS. 2 and 3 it will be noted that alternate planes are arranged to place the blade members thereof in staggered relation. This arrangement aids in the pumping action provided by the bottom bevels 42 and additionally provides for blade assembly balancing which is important in high speed operation of the unit. While any suitable arrangement of blade members having top and bottom bevels may be used to accomplish the desired purpose, it has been found preferable to form several of the uppermost series and at least two of the lowermost series of blade members from blade members having only bottom bevels 42. With this arrangement the uppermost series function to move the meat away from the delivery pipe 32 to aid in maintaining continuous and uniform delivery of meat into the barrel 12 and the lowermost series function to discharge the comminuted meat at an adequate rate into the rotor 23 to enhance continuous movement of the meat through the chopper and smooth out the flow of meat into the rotor. Intermediate series of blade members may be formed from any combination of blade members having either top or bottom bevels depending upon the controlled rate of flow and the material detention desired in operation of the unit.

As shown in FIGS. 2 and 3, each series of blade members may preferably consist of six blade members with the top three series (FIG. 1) having all blade members provided with bottom bevels 42 and the bottom two series having their blade members provided solely with bottom bevels 42. The top blade series shown in FIG. 2 consists of four blade members having top bevels 43 and two blade members having bottom bevels 42. With this arrangement it will be appreciated that the meat upon contact by this series of blade members will be slightly detained in its downward progress along the surface 40 of the barrel 12. The next blade series immediately below the top blade series shown in FIG. 2 may have four blade members with bottom bevels 42 and two blade members with top bevels 43. The series of blade members shown in FIG. 3 are provided with the same ratios of top and bottom bevels as described in connection with FIG. 2 but it will be noted that the circumferential sequence of top and bottom bevels in each series is varied as compared with the sequence of the series of FIG. 2.

From the foregoing, it will be understood that many different arrangements of top and bottom beveled blade members may be used. Preferably, the two types of blade members will be mixed in each series of blade members with the exception of the several topmost and bottommost series. While examples of 4:2 ratios have been given, other ratios such as 3:3, 5:1 and 6:0 may be utilized. FIG. 1 illustrates the use of a substantial number of series of blade members although it will be understood that the total number may vary rather substantially depending on operational demands. Merely by way of example, eleven series of blade members may be used. In such a complement, the first three series may consist solely of blade members having bottom bevels 42. The series 4, 6 and 8 (counting from the top) may be formed from four blade members having top bevels 43 and two blade members having bottom bevels 42. The series 5, 7 and 9 may be formed from blade members of which four have bottom bevels 42 and two have top bevels 43. The bottom series 10 and 11 will preferably be formed from blade members having bottom bevels 42. By utilizing the principle of bevel variation, it has been found that meat may be chopped at the rate of 100 pounds per minute while experiencing a temperature rise of about 13° F. With a change in the pattern of bevel arrangement, meat can be chopped at a rate of 150 pounds per minute while maintaining a temperature rise of about 13° F.

In the operation of high speed choppers of the type described, the material undergoing comminution may include particles of varying toughness. In considering the comminution of meat, it has been found that the meat supply may include particles of muscle tissue, etc. which may be substantially tougher than other particles to an extent that when struck with the sharpened edge of a blade member the tougher particle will become lodged on the sharpened edge and will stay with the blade member and will rotate therewith. This interferes with efficient operation of the chopper and if the lodged particle remains on the blade member over a substantial period of time, the temperature thereof will substantially increase and the particle will become more permanently adhered to the blade member. Phenomenon such as this often causes more frequent interruption of chopper operation for cleaning purposes and can materially cut down on the capacity of the chopper over a given period of time.

In overcoming this problem, the barrel 12 of the housing 11 as shown in the various figures of the drawings is provided with a plurality of circumferentially spaced, longitudinally directed grooves 44 past which the blade members 15 rotate at substantially right angles thereto and in close proximity thereto. Any number of grooves 44 may be formed in the inner surface 40 of the barrel 12 and, as best shown in FIG. 4, each groove may be tapered to a point of termination in a direction toward the discharge end of the barrel 12 and short of the discharge end. With this arrangement the grooves 44 can be formed by machining the barrel 12 throughout its thicker area while leaving the bottom depending flange 26 thereof intact. It is not necessary that the grooves 44 extend the full longitudinal length of the barrel 12 as the tougher particles will be adequately removed by the grooves from the blade members or will be adequately comminuted by the time that the meat moves into association with the lower rows of blade members.

Referring particularly to FIG. 5, each groove 44 includes a radial surface shoulder portion 45 terminating at the base thereof in a radius joining an inclined surface 46 which extends to juncture with the inner surface 40 of the barrel 12. The radial shoulder portion 45 is opposed to the direction of rotation of the blade members 15 and the inclined surface 46 is designed to permit ready projection of a particle 47 lodged on a blade member 15 into the groove for abutment with the shoulder portion 45 as the blade member moves past the groove 44. This abutment results in the dislodgement of the particle 47 from the blade member 15 and the particle, due to the shape of the groove 44, is not wedged therein and is free to return to the sleeve-like accumulation of meat moving along the surface 40 for further contact with blade members and comminution. Where a particle 47 may be loosely lodged on a blade member 15 between the same and the barrel surface 40, the action of the groove 44 described will occur in the same manner. Loose lodging of a particle on a blade member at a point spaced inwardly of the surface 40 results in eventual movement of the particle along the blade member in response to centrifugal force until the same contacts the surface 40 and is in position for abutment with a shoulder portion 45. The grooves 44 will result in either complete dislodgement of a particle from a blade member or the breaking or comminution of such a particle as a result of impact thereof with the shoulder portion 45.

While the grooves 44 are illustrated as extending vertically, the same may be inclined along the surface 40 of the barrel relative to the vertical axis. With an adequate inclination, the grooves may be self-cleaning as a result of material undergoing comminution passing downwardly along the surface 40.

By way of example only, the barrel 12 may be provided with eleven grooves equally spaced throughout. Each groove may be of a total width of 3/16 of an inch at its widest part and of a depth of about 1/16 of an inch at its deepest part. These dimensions have been found suitable for use in choppers in the comminution of meat in the forming of sausage and wiener type products.

Obviously certain modifications and variations of the invention as hereinbefore set forth may be made without departing from the spirit and scope thereof, and therefore only such limitations should be imposed as are indicated in the appended claims.

I claim:

1. Material comminution apparatus comprising a cylindrical housing having material inlet and discharge means, a rotatable blade assembly in said housing between said material inlet and discharge means and including relatively thin and flat blade members having sharpened outer edges extending into close non-engaging proximity to the inner surface of said housing for movement along said inner surface in a direction longitudinally of said edges, and at least one longitudinally directed groove in the inner surface of said housing defining a recessed radial shoulder portion transversely opposed to the direction of movement of said blade members and past which the sharpened edges of said blade members move in close slicing proximity, said groove being of sufficient width to provide for dislodgement of material which tenaciously adheres to said edges.

2. The apparatus of claim 1 wherein the inner surface of said housing is provided with a plurality of said grooves with each groove diminishing in width and depth in a direction toward said discharge means.

3. Material comminution apparatus comprising a cylindrical housing having material inlet and discharge means, a rotatable blade assembly in said housing between said material inlet and discharge means and including blade members extending therefrom into close proximity to the inner surface of said housing, and at least one longitudinally directed groove in the inner surface of said housing defining a generally radial surface past which said blade members move in close proximity to provide for dislodgement of material which tenaciously adheres to said blade members, said radial surface terminating at the base thereof in a radius joining an inclined surface extending to juncture with the inner surface of said housing to complete said groove.

4. The apparatus of claim 3 wherein the inner surface of said housing is provided with a plurality of grooves with each groove diminishing in width and depth in a direction toward said discharge means.

5. A continuous chopper assembly including a cylindrical housing having received therein a rotatable shaft provided with a plurality of blade members mounted thereon, said blade members including arcuate sharpened and beveled portions extending into close association with the inner surface of said housing for comminution of material therealong and movement of material through said housing, inlet means in said housing for the delivery of material thereinto for comminution, drive means for said shaft to rotate the same and said blade members at high speeds to provide for centrifiugal accumulation of said material along the inner surface of said housing, said inner surface having at least one longitudinally directed groove therein defining a recessed shoulder portion opposed to the direction of movement of said blade members to provide for dislodgement of material which tenaciously adheres to said blade members, and material collection and discharge means in operative association with said housing to receive comminuted material therefrom, said collection and discharge means including a bowl-like rotor connected to said shaft for rotation thereby and peripheral accumulation of comminuted material therein, and a material pick-up tube in said rotor for removal of accumulated material therefrom and discharge thereof from said assembly.

6. A continuous chopper assembly including a cylindrical housing having received therein a rotatable shaft provided with a plurality of series of blade members mounted thereon, said blade members including arcuate sharpened and beveled portions extending into close association with the inner surface of said housing for comminution of material therealong and movement of material through said housing, the opposite end series of blade members being beveled in a direction to move said material through said housing while at least some of the blade members of intermediate series are provided with oppositely directed bevels to momentarily detain said material in said housing for further comminution thereof, inlet means in said housing for the delivery of material thereinto for comminution, drive means for said shaft to rotate the same and said blade members at high speeds to provide for contrifugal accumulation of said material along the inner surface of said housing, said inner surface having at least one longitudinally directed groove therein defining a recessed shoulder portion opposed to the direction of movement of said blade members to provide for dislodgement of material which tenaciously adheres to said blade members, and material discharge means in said housing for the discharge of comminuted material therefrom.

7. The assembly of claim 6 wherein the inner surface of said housing is provided with a plurality of grooves with each groove diminishing in a direction toward said discharge means.

8. A continuous chopper assembly including a cylindrical housing having received therein a rotatable shaft provided with a plurality of series of blade members mounted thereon, said blade members including arcuate sharpened and beveled portions extending into close association with the inner surface of said housing for comminution of material therealong and movement of material through said housing, the opposite end series of blade members being beveled in a direction to move said material through said housing while at least some of the blade members of intermediate series are provided with oppositely directed bevels to momentarily detain said material in said housing for further comminution thereof, inlet means in said housing for the delivery of material thereinto for comminution, drive means for said shaft to rotate the same and said blade members at high speeds to provide for centrifugal accumulation of said material along the inner surface of said housing, said inner surface having at least one longitudinally directed groove therein defining a recessed shoulder portion opposed to the direction of movement of said blade members to provide for dislodgement of material which tenaciously adheres to said blade members, and material collection and discharge means in operative association with said housing to receive comminuted material therefrom, said collection and discharge means including a bowl-like rotor connected to said shaft for rotation thereby and peripheral accumulation of comminuted material therein, and a material pick-up tube in said rotor for removal of accumulated material therefrom and discharge thereof from said assembly.

9. The assembly of claim 8 wherein the inner surface of said housing is provided with a plurality of grooves with each groove diminishing in width and depth in a direction toward said discharge means.

10. In meat product material comminution apparatus comprising a cylindrical housing having material inlet and discharge means, and a rotatable blade assembly in said housing between said material inlet and discharge means, the provision of blade members in said blade assembly which include outer edge arcuate sharpened and beveled portions mounted for movement transversely along the inner surface of said housing in close association therewith, at least a substantial number of the bevels of the blade members adjacent said inlet and discharge means being located on the edge portions of said blade members facing said discharge means to move material in a direction from said inlet means toward said discharge means and through said housing, at least some of the blade members intermediate those adjacent to said inlet and discharge means having the bevels located on the edge portions thereof facing said inlet means to momentarily detain said material in said housing for further comminution thereof.

11. The apparatus of claim 10 wherein the blade members of the assembly are arranged in a plurality of axially aligned series with the blade members of each series being mounted in the same plane, at least the series at opposite ends of said assembly having all blade members thereof provided with bevels facing said discharge means for moving the material through said housing, the intermediate series of blade members each including alternately oppositely facing bevels.

References Cited in the file of this patent

UNITED STATES PATENTS

| | | |
|---|---|---|
| 1,254,008 | Heishman | Jan. 15, 1918 |
| 2,066,621 | Gray | Jan. 5, 1937 |
| 2,742,937 | Herzer | Apr. 24, 1956 |
| 2,941,561 | Pavia | June 21, 1960 |
| 2,972,473 | Heller | Feb. 21, 1961 |
| 2,974,701 | Eberman | Mar. 14, 1961 |